Figure 1:
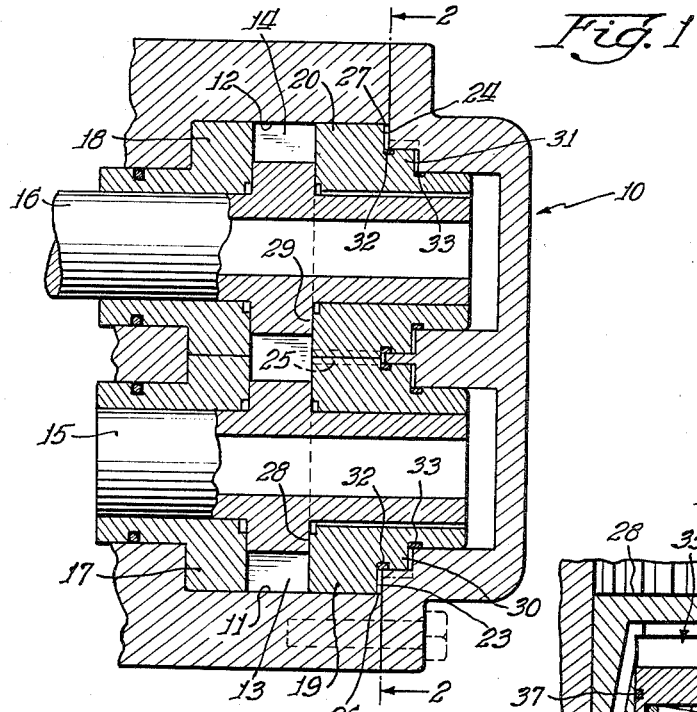

April 19, 1960     E. R. JUDKINS     2,933,047

PRESSURE LOADED PUMP

Filed Nov. 5, 1956

Inventor:
Edwin R. Judkins
By: Joseph R. Dwyer
Atty.

United States Patent Office 2,933,047
Patented Apr. 19, 1960

2,933,047

PRESSURE LOADED PUMP

Edwin R. Judkins, East Cleveland, Ohio, assignor to Borg-Warner Corporation, Chicago, Ill., a corporation of Illinois Application November 5, 1956, Serial No. 620,257

10 Claims. (Cl. 103—126)

This invention relates to a pressure loaded gear pump and more particularly to an arrangement providing low starting torque conditions and high load operating conditions for the pressure loadable bushings in a pressure loaded gear type pump.

In a pressure loaded, intermeshing gear pump having one or more axially movable pressure loadable bushings, part of the output or discharge pressure generated by the pump is applied to the rear or motive surfaces of the axially movable bushings to urge these bushings into sealing engagement with their associated gear side faces. As disclosed in the United States Patent No. 2,420,622 to Roth et al., by carefully selecting the relative areas of the forward surfaces of the bushings adjacent the gear side faces and the rear or motive surfaces of the bushings, it is possible to control within very close limits the acual sealing pressure provided. In practice, this requires a somewhat higher effective pressure in the direction of seal than in the direction tending to open the seal.

In the usual form of pressure loaded pumps of the type herein described, it is common practice to provide the axially movable bushings with initial loading springs which urge the bushings against their associated gear side faces with sufficient force during starting of the pump to permit a pressure build up behind the bushings. It has been found, however, that where the fluid being pumped, for example, aircraft fuel, does not offer sufficient lubrication between the gear side faces and the forward gear engaging faces of the bushings, excessive wear and high starting torque exists. Also, it has been found that in pumping such fluid that it is difficult to select the precise relative effective pressure area relationship between the motive areas, behind the bushings and on the forward faces of the bushings to provide for optimum seal and unless this precise relationship exists, either excessive wear on the forward faces will result or the bushings tend to unload prior to the time that the pump has reached its operating pressure for which it is designed.

One explanation of this tendency to unload prior to the time the selected operating pressure is reached is that the pressurized fluid normally existing as a pressure gradient between the high pressure side of the pump and the low pressure side of the pump at operating pressure does not always exist as such when the pump is generating pressure less than operating pressures.

This rather erratic condition makes it difficult to select the precise relationship of areas and in some circumstances, obviously, the force in the direction of seal may be greater than is necessary causing excessive wear and under other conditions, the force may be less than is necessary causing unloading of the pump—a condition often referred to as marginal loading conditions. An attempt to overcome this condition by the use of the initial loading springs of high compression causes high torque starting conditions as above-mentioned without solving this marginal loading condition.

Accordingly, it is a primary object of my invention to provide a pressure loaded gear pump with a means for allowing low starting torque conditions and providing for an increase in sealing pressure for a pump during marginal loading conditions normally tending to cause unloading of the bushings where the selection of the relative sizes of the forward surfaces and the motive surfaces cannot safely be made.

I propose to accomplish this primary object by the provision of at least one spring and fluid pressure assembly each having an initial loading spring of a selected compression rate which urges a piston and its associated axially movable bushing into sealing relationship with its associated gear side face and which piston is subject to discharge pressure during operation of the pump which urges the piston in a direction opposite to the spring pressure causing compression of the spring which reacts with the discharge pressure acting on the piston to urge the bushing into sealing relationship. By this arrangement, the initial loading spring can be selected for a relatively low value during starting conditions and will have a higher value during operating conditions because of its compression during operation thereof which compression reacts against the bushing to urge the same into sealing relationship which spring compression exists even when the pump is generating pressure below its operating discharge pressure.

Accordingly, it is an additional object of my invention to provide a pressure loaded gear pump of the type herein contemplated with an arrangement whereby a lesser spring force is utilized during starting conditions and a higher spring force is utilized during operating conditions thus providing low starting torqe conditions and high spring loading operating conditions.

Figure 3:
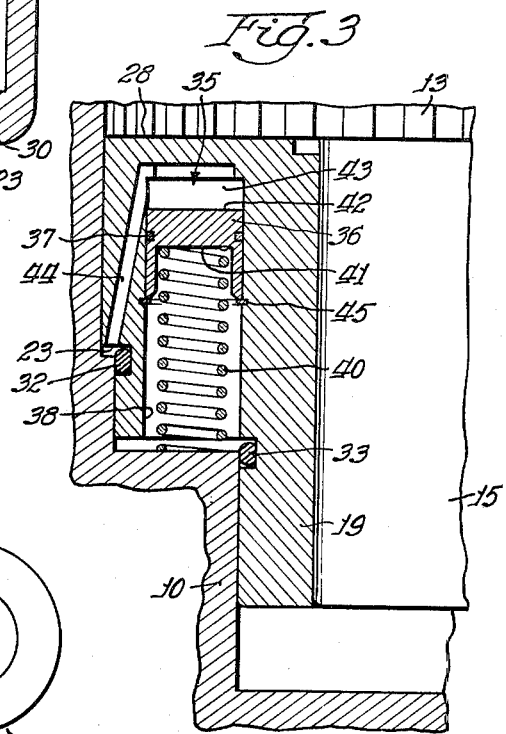
Figure 2:
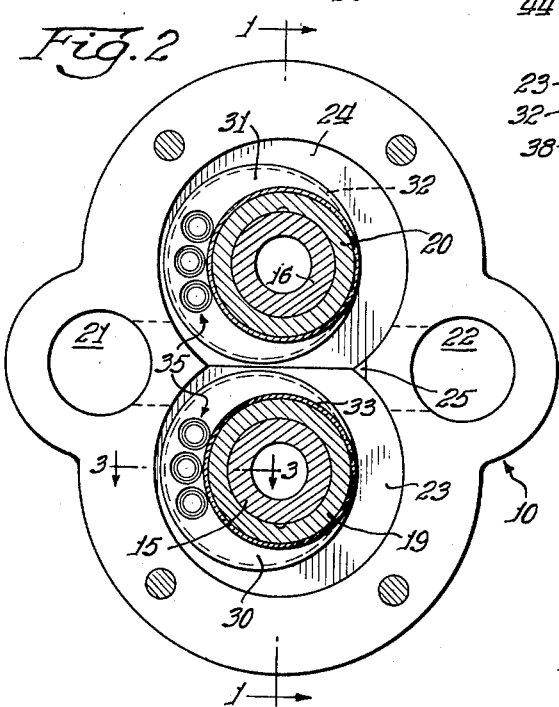

Other objects and advantages of the present invention will be apparent from the following detailed description thereof taken in conjunction with the drawings wherein:

Figure 1 is a fragmentary, axial, sectional view, substantially along line 1—1 of Figure 2, of a pressure loaded type intermeshing gear pump constructed in accordance with one embodiment of this invention;

Figure 2 is a transverse sectional view taken substantially along line 2—2 of Figure 1 and showing to advantage the arrangement of the spring and fluid pressure responsive pistons constructed in accordance with the teachings of my invention; and Figure 3 is a sectional view taken along line 3—3 of Figure 2 and showing to advantage the location of the fluid and spring pressure responsive pistons with respect to the fluid pressure responsive axially movable bushings constructed in accordance with one embodiment of this invention.

Referring now to the drawings and more particularly to Figure 1 thereof, a pump generally similar to that shown in the aforementioned Roth et al. United States Patent No. 2,420,622 (except for the configuration and construction of the pressure loadable bushings) is illustrated comprising a housing indicated in its entirety by numeral 10 having formed therein a pair of parallel intersectioning bores or pumping chambers 11 and 12, which are arranged to receive, in complimentary relationship, intermeshing pumping gears 13 and 14, respectively. In the embodiment illustrated in Figure 1, the pumping gears have integrally formed therewith hollow journal shafts 15 and 16, respectively, the left-hand portions of the journal shafts 15 and 16 being journalled in fixed, flanged, body bushings 17 and 18 mounted in the left portion of the pumping gear chambers 11 and 12. The right-hand portions of the journal shafts are received in axially movable, pressure loadable, flanged bushings 19 and 20 mounted in the right side of the pumping gear chambers 11 and 12.

In the embodiment illustrated, the upper pumping gear 14 is the driving gear and may be rotated in a clockwise direction, as viewed in Figure 2. In accordance with conventional pump design practice the journal shaft 16 of the upper gear 14 may be extended to the left as viewed in Figure 1 and coupled to a suitable source of power (not shown). Low pressure fluid is introduced into the pump housing at inlet 21 formed in the left side of the pump housing, as viewed in Figure 2, and high pressure liquid is discharged from the pump housing through outlet 22 formed in the right side of the housing; the inlet and outlet communicating with inlet and discharge areas of the intermeshing pumping gears. Pressure loadable, axially movable, bushings 19 and 20 are normally received in the bores or chambers 11 and 12 with sufficient clearance to permit slight axial movement of the bushings with respect to the bores to establish the desired pressure seal during operation of the pump.

In the operation of a pump of this type, that is, a pump constructed in accordance with the teachings of the aforementioned Roth et al. patent, discharge pressure generated by the intermeshing gears may be communicated from the outlet or discharge side thereof to the pressure loading or motive surface areas, designated as 23 and 24 in the drawings, and located in the back of the flanged portion of the bushings by an axially extending passage 25 formed between the peripheries of the flanged portions of the bushings on the discharge side at their point of convergence with the housing of the pump. The passage 25 extends from the discharge side of the gears, as viewed in Figure 1, to the intercommunicating portions of the pressure loading chambers 26 and 27 at the point of juncture.

In the usual form of pressure loaded pump, the pressure loading motive chambers 26 and 27 formed in part by the housing 10 and the motive surface areas 23 and 24, to which the discharge pressure is directed, are substantially uniformly subject to output pressure when the pump is operating at the pressure for which it is designed, but this is not true of the forward or gear engaging surfaces or faces 28 and 29 of the bushing. These forward faces are normally subjected to a pressure gradient when the pump is operating at the pressure for which it is designed, extending from the inlet side 21 to the outlet side 22 with the lowest pressure of the gradient near the inlet and the highest pressure of the gradient near the outlet. Accordingly, it would be evident that while the total pressure forces acting on the motive surfaces of the bushing may be made to be slightly greater than the total pressure forces acting on the motive surfaces of the bushing may be made to be slightly greater than the total pressure forces acting on the forward surfaces of the movable bushings, these pressures acting on the particular areas of the forward surfaces will not be uniform tending to break the seal near the portion of the bushing adjacent the outlet. There are several means of compensating for this pressure gradient in pressure loaded pumps of this type, one of which is disclosed in the co-pending United States application, Serial No. 393,029, now Patent No. 2,824,523, by Henry H. Campbell and James A. Compton, filed November 13, 1953 as a continuation of an earlier filed application, Serial No. 168,216, filed June 15, 1950, now abandoned. In that application, there is described a pressure loaded pump having eccentric or offset loaded bushings whereby the motive surface areas are provided with a major area and a minor area, the major area being adjacent the outlet so as to overcome the higher pressure forces adjacent the outlet acting on the forward gear engaging surfaces of the bushings.

In accordance with that invention, a boss of circular configuration is formed on the back of the flanged portion of each pressure loaded bushing, this boss being designated as 30 and 31 on bushings 19 and 20 respectively. These boss portions have their centers offset with respect to the axis of the bushing, being located nearer the left side of the bushing than the right as viewed in Figure 2 whereby a larger portion of the motive surface areas 23 and 24, exposed to discharge pressure, lie adjacent the outlet side of the pump. O ring seals 32, 32, in the embodiment disclosed, operatively disposed between pressure loading chambers 26 and 27 and encircling the bosses 30 and 31 and O ring seals 33, 33 disposed about the tubular portion of the bushings effectively prevent the leakage of pressure from the chambers 26 and 27 and rearwardly of the bushings. Any pressure that may leak past these O ring seals is vented to inlet pressure or to a one of intermediate pressure, that is, a pressure less than discharge pressure, but higher than inlet pressure, according to conventional pressure loading pump practice. These substantially annular offset loading areas 23 and 24 function to compensate for the pressure gradient normally encountered in the operation of the gear pump at its designing operating pressure and since such operation is more fully described in the aforementioned Campbell and Compton application, no further detailed description is deemed necessary herein, and while I have described my present invention relating to the reducing of starting torque and the correction of marginal loading problems in connection with the one piece offset loaded pump described and claimed in this Campbell and Compton application, such correction is by way of example only. It is to be understood that my present invention is equally applicable in all types of pressure loaded pumps.

In accordance with the present invention, there is associated with each of the pressure loadable, axially movable bushings, one or more spring and fluid pressure piston assemblies, each designated in its entirely as 35, which exert a force tending to move the axially movable, pressure loadable bushings toward the gear side faces. Since each axially movable bushing has one or more such assemblies 35, and since each such assembly is identical with the other, only one such assembly need be described herein.

In more particularity, the piston assembly 35 of this invention, as shown more clearly in Figure 3, comprises a piston 36 of generally cylindrical form having its midportion thereof grooved to receive an O-ring seal 37 and which is slidably journalled in an axially extending cylindrical chamber or bore 38 formed in the bushing 19. Associated with the piston 36 is a helically coiled spring 40 one end of which bears against an axial recess 41 formed in one end of the piston 36. The other end of spring 40 bears against the housing 10, and, obviously, by selecting the compression rate of spring 40, the force exerted by it may be closely regulated. Face 42 formed by the other end of the piston 36 opposite to the axial recess 41 forms together with the cylindrical bore 38 an expansible pressure chamber 43 to which discharge pressure is admitted through passage 44 formed in the bushing 19 in communication with the pressure loading chamber 26. Obviously, discharge pressure admitted through passage 44 to expansible chamber 43 and acting on face 42 urges the piston member 36 in a direction opposite to the action of the spring tending to urge the piston 36 toward the direction of sealing. The total displacement of piston 36 by operation of discharge pressure in the expansible chamber 43 is selected by the location of the snap rings 45 disposed about this bore 38 and the displacement of piston 36 by the spring 40 is governed by the depth of the bore 38 in the flange of the bushing 19.

In a manner taught by this invention, the selection of the force to be exerted by the spring 40 urging the piston and the bushing 19 into sealing relationship, in the absence of discharge pressure, may be carefully selected by the location of and the number of such piston assemblies 35 and it is to be noted that the spring 40 is under less compression when no discharge pressure is admitted to the expansible chamber 43 thus the springs provide a small initial loading force requiring low starting torque. On the other hand, during operation of the pump when discharge pressure is communicated to the pressure loading chamber 26 and to the expansible chamber 43 through passage 44 to the reaction of the pressure in the expansible chamber 43 causing compression of the spring 40 causes an increased spring force urging the bushing in the direction of sealing relationship so that piston assembly 35 under these conditions provide a high loading force combination of spring and hydraulic force.

From the above description it can be seen that I have provided a means for a pressure loaded pump whereby a lesser spring force for intial loading results in less torque for starting with consequent less friction and wear, which springs are utiled during operating conditions to provide higher spring loading which is of particular value under conditions where the relationship between the motive surface areas and the forward surface areas under conditions where there is a tendency for the bushings to unload prior to the time the pump reaches its operating pressure conditions which tendency to unload if attempted to be corrected by an increase in sealing force by the selection of the relationship between the motive surface areas and the forward surface areas would cause increased wear.

Where herein the various parts of my invention have been referred to as being located in the right or left portion or in the upper or lower portion, it will be understood that this is done solely for the purpose of facilitating description, and that such references relate only to the respective positions of the parts as shown in the accompanying drawings.

While only one embodiment of my invention is shown and described viz., obviously the chamber or bore 38 to receive the piston 36 could be formed in the housing or cover as well as in the bushings as shown, it will be understood that this is by way of example rather than limitation, and it is intended that the invention be defined by the appended claims which should be given a scope as broad as consistent with the prior art.

I claim:

1. In a pressure generating pump of the type including a housing containing intermeshing gears and having an inlet leading to and an outlet leading from said housing, axially movable bushings each having a forward surface engageable with the side face of said gears, said axially movable bushings being subject to discharge pressure to maintain sealing engagement with the gear side faces during operation of the pump, and means associated with said axially movable bushings for maintaining said bushings in engagement with the gear side faces with a predetermined spring pressure during starting of said pump and with a greater spring pressure than said predetermined spring pressure during operation of said pump.

2. In a pressure generating pump of the type including a housing containing intermeshing gears and having an inlet leading to and an outlet leading from said housing, axially movable bushings each having a forward surface engageable with the side face of said gears, said axially movable bushings being subject to discharge pressure to maintain sealing engagement with the gear side faces during operation of the pump, and means associated with said axially movable bushings for maintaining said bushings in engagement with the gear side faces with a predetermined spring pressure during starting of said pump and with a greater spring pressure than said predetermined spring pressure during operation of said pump, said means comprising at least one spring responsive piston so constructed and arranged to urge its associated bushing toward its associated gear side face with a predetermined spring force and subject to discharge pressure urging said piston in the opposite direction during operation of the pump, which discharge pressure causes compression of said spring which reacts to urge said bushing toward its associated gear side face with greater spring force than said predetermined spring force.

3. In a pressure generating pump of the type including a housing containing intermeshing gears and having an inlet leading to and an outlet leading from said housing, axially movable bushings each having a forward surface engageable with the side face of said gears, said axially movable bushings having flanged portions and barrel portions, said flanged portions being subject to discharge pressure to maintain sealing engagement with the gear side faces during operation of the pump, and means associated with said axially movable bushings for maintaining said bushings in engagement with the gear side faces with a predetermined spring pressure during starting of said pump and with a greater spring pressure than said predetermined spring pressure during operation of said pump.

4. In a pressure generating pump of the type including a housing containing intermeshing gears and having an inlet leading to and an outlet leading from said housing, axially movable bushings each having a forward surface engageable with the side face of said gears, said axially movable bushings having flanged portions and barrel portions, said flanged portions being subject to discharge pressure to maintain sealing engagement with the gear side faces during operation of the pump, and means associated with said axially movable bushings for maintaining said bushings in engagement with the gear side faces with a predetermined spring pressure during starting of said pump and with a greater spring pressure than said predetermined spring pressure during operation of said pump, said means comprising at least one spring responsive piston so constructed and arranged to urge its associated bushing toward its associated gear side face with a predetermined spring force and subject to discharge pressure urging said piston in the opposite direction during operation of the pump, which discharge pressure causes compression of said spring which reacts to urge said bushing toward its associated gear side face with greater spring force than said predetermined spring force.

5. In a pressure generating pump of the type including a housing containing intermeshing gears and having an inlet leading to and an outlet leading from said housing, axially movable bushings each having a forward surface engageable with the side face of said gears, said axially movable bushings having flanged portions and barrel portions, said flanged portions being subject to discharge pressure to maintain sealing engagement with the gear side faces during operation of the pump, and means associated with the flanged portions of said axially movable bushings for maintaining said bushings in engagement with the gear side faces with a predetermined spring pressure during starting of said pump and with a greater spring pressure than said predetermined spring pressure during operation of said pump.

6. In a pressure generating pump of the type including a housing containing intermeshing gears and having an inlet leading to and an outlet leading from said housing, axially movable bushings each having a forward surface engageable with the side face of said gears, said axially movable bushings having flanged portions and barrel portions, said flanged portions being subject to discharge pressure to maintain sealing engagement with the gear side faces during operation of the pump, and means associated with the flanged portions of said axially movable bushings for maintaining said bushings in engagement with the gear side faces with a predetermined spring pressure during starting of said pump and with a greater spring pressure than said predetermined spring pressure during operation of said pump, said means comprising at least one spring responsive piston so constructed and arranged to urge its associated bushing toward its associated gear side face with a predetermined spring force and subject to discharge pressure urging said piston in the opposite direction during operation of the pump, which discharge pressure causes compression of said spring which reacts to urge said bushing toward its associated gear side face with greater spring force than said predetermined spring force.

7. In a fluid pump of the type including a housing having an inlet and an outlet formed therein, a rotatable pumping member in said housing for transferring fluid from inlet to said outlet, axially movable end plate means having a forward surface engageable with one side of said pumping member in sealing relation, said end plate means being axially movable with respect to said pumping member, a motive surface on said end plate axially located with respect to said forward surface and adapted in response to application of loading pressure thereto to urge said end plate toward said rotatable member to establish sealing relation, conduit defining means for continuously communicating loading pressure generated by said pump to said motive surface, and means associated with said motive surface for maintaining said end plate in engagement with said rotatable member with a predetermined spring pressure during starting of said pump and with a greater spring pressure than said predetermined spring pressure during operation of said pump.

8. In a fluid pump of the type including a housing having an inlet and an outlet formed therein, a rotatable pump member in said housing for transferring fluid from said inlet to said outlet, axially movable end plate means having a forward surface engageable with one side of said pumping member in sealing relation, said end plate means being axially movable with respect to said pumping member, a motive surface on said end plate axially located with respect to said forward surface and adapted in response to application of loading pressure thereto to urge said end plate toward said rotatable member to establish sealing relation, conduit defining means for continuously communicating loading pressure generated by said pump to said motive surface, and means associated with said motive surface for maintaining said end plate in engagement with said rotatable member with a predetermined spring pressure during starting of said pump and with a greater spring pressure than said predetermined spring pressure during operation of said pump, said means comprising at least one spring responsive piston so constructed and arranged to urge its associated end plate toward said rotatable member with a predetermined spring force and subject to loading pressure urging said piston in the opposite direction during operation of the pump, which loading pressure causes compression of said spring which reacts to urge said end plate toward said rotatable pumping member with greater spring force than said predetermined spring force.

9. In a hydraulic apparatus of the type including a housing containing intermeshing gears and having an inlet leading to and an outlet leading from said housing, axially movable bushings each having a forward surface engageable with the side face of said gears, and spring means associated with said axially movable bushings for maintaining said bushings in engagement with the gear side faces with a predetermined spring pressure during starting of said hydraulic apparatus and with a greater spring pressure than said predetermined spring pressure during operation of said hydraulic apparatus.

10. In a hydraulic apparatus of the type including a housing containing intermeshing gears and having an inlet leading to and an outlet leading from said housing, axially movable bushings each having a forward surface engageable with the side face of said gears, and spring means associated with said axially movable bushings for maintaining said bushings in engagement with the gear side faces with a predetermined spring pressure during starting of said hydraulic apparatus and with a greater spring pressure than said predetermined spring pressure during operation of said hydraulic apparatus, said spring means comprising at least one spring responsive piston so constructed and arranged to urge its associated bushing into engagement with its associated gear side face with a predetermined spring force and subject to fluid pressure urging said piston in the opposite direction during operation of said hydraulic apparatus, which fluid pressure causes compression of said spring which reacts to urge said bushing toward its associated gear side face with a greater spring force than said predetermined spring force.

References Cited in the file of this patent

UNITED STATES PATENTS

| | | |
|---|---|---|
| 2,312,655 | Lauck | Mar. 2, 1943 |
| 2,312,891 | Ferris | Mar. 2, 1943 |
| 2,420,622 | Roth et al. | May 13, 1947 |
| 2,434,135 | Witchger | Jan. 6, 1948 |
| 2,627,232 | Lauck | Feb. 3, 1953 |
| 2,649,740 | Murray et al. | Aug. 25, 1953 |
| 2,691,945 | Wichorek | Oct. 19, 1954 |
| 2,695,566 | Compton | Nov. 30, 1954 |
| 2,728,301 | Lindberg | Dec. 27, 1955 |
| 2,742,862 | Banker | Apr. 24, 1956 |
| 2,758,548 | Rockwell | Aug. 14, 1956 |
| 2,772,638 | Nagely | Dec. 4, 1956 |
| 2,786,553 | Boone et al. | Mar. 26, 1957 |
| 2,816,512 | Murray | Dec. 17, 1957 |